United States Patent [19]

Davis

[11] Patent Number: 5,164,982
[45] Date of Patent: Nov. 17, 1992

[54] TELECOMMUNICATION DISPLAY SYSTEM

[75] Inventor: Richard A. Davis, Boulder, Colo.

[73] Assignee: Radish Communications Systems, Inc., Boulder, Colo.

[21] Appl. No.: 589,203

[22] Filed: Sep. 27, 1990

[51] Int. Cl.⁵ .......................................... H04M 11/00
[52] U.S. Cl. ...................................... 379/96; 379/91; 379/54
[58] Field of Search ................ 379/90, 91, 93, 96-98, 379/100, 53, 54

[56] References Cited

U.S. PATENT DOCUMENTS

| | | | |
|---|---|---|---|
| 4,071,697 | 1/1978 | Bushnell et al. | 379/91 |
| 4,387,271 | 6/1983 | Artom . | |
| 4,578,535 | 3/1986 | Simmons | 379/93 |
| 4,581,484 | 4/1986 | Bendig | 379/96 |
| 4,608,686 | 8/1986 | Barsellotti . | |
| 4,656,654 | 4/1987 | Dumas | 379/96 |
| 4,659,876 | 4/1987 | Sullivan et al. . | |
| 4,700,378 | 10/1987 | Brown | 379/96 |
| 4,715,059 | 12/1987 | Cooper-Hart et al. | 379/53 |
| 4,723,268 | 2/1988 | Newell et al. . | |
| 4,788,682 | 11/1988 | Vij et al. . | |
| 4,815,121 | 3/1989 | Yoshida . | |
| 4,827,085 | 5/1989 | Yaniv et al. . | |
| 4,845,636 | 7/1989 | Walker | 379/53 |
| 4,908,851 | 3/1990 | Kotani et al. . | |
| 4,932,047 | 6/1990 | Emmons et al. | 379/98 |

FOREIGN PATENT DOCUMENTS

| | | | |
|---|---|---|---|
| 1-288049 | 11/1989 | Japan | 379/90 |
| 2052122 | 1/1981 | United Kingdom | 379/100 |

OTHER PUBLICATIONS

"Luma ™: The Phone That's Not All Talk", *Telephony*, Dec. 29, 1986, p. 19.

Primary Examiner—James L. Dwyer
Assistant Examiner—Wing F. Chan
Attorney, Agent, or Firm—James R. Young

[57] ABSTRACT

Existing voice telephone communications are augmented in a simple and understandable way by the addition of a "dumb" display terminal at a subscriber's location. Text, graphics, and picture data can be transmitted in ASCII code or other protocol, over existing, standard telephone lines and displayed on the terminal. The "dumb" feature is due to the display terminal having a voice/data selector that can automatically recognize digital data and switch from voice communication to data communication modes. Accordingly, this display terminal is entirely self contained and is controlled from a remote location, such as a telemarketing agents position, requiring nothing more from the subscriber than mere possession of the display terminal.

9 Claims, 4 Drawing Sheets

TELECOMMUNICATION DISPLAY SYSTEM

BACKGROUND OF THE INVENTION

1. Field of the Invention

The present invention relates to telecommunications systems and more specifically to a telecommunications system adapted for transmission of speech and display data over standard, existing telephone lines for audiographic communication between parties in which the transmission and reception of display data during a voice communication are controlled entirely by a sending party without any input or action from the receiving party.

2. Description of the Prior Art

Ever since the Carterfone decision in 1968 (in the United States) which allowed non-AT&T equipment to be connected to the telephone network, there has been a proliferation of new telephone devices and systems. In addition to telephones with expanded features, this movement has given rise to answering machines, computer modems, and facsimile devices. This expansion of services and equipment was further enhanced by the divestiture of AT&T in 1984.

It is now desirable to be able to transmit a visual image of data being discussed by parties over a telephone line concurrent with the verbal discussion. For example, a travel agent might wish to show a telephone customer a travel itinerary as they are discussing it, or a broker might want to show a customer a visual confirmation of a financial transaction which the customer has just made orally over the telephone. Facsimile devices for transmitting data over telephone lines and displaying it for a receiving person in visual form are becoming increasingly popular, especially in businesses. With their ability to transmit documents anywhere in the world over existing telephone lines, they have literally changed the way we conduct business. For some purposes, however, even such facsimile technology is too slow, unhandy, and not suitable for many consumer and other purposes, because, for example, assuming that both parties even have facsimile machines, it normally requires a dedicated line and the existence of a hard copy of the data to be transmitted, and it takes some time to feed the hard copy into the facsimile transmitting machine and for the receiving facsimile machine to print out a hard copy of the data for the receiving party. With the increasing popularity of facsimile machines, they have become common even among small businesses and individuals. However, because such small users frequently have only a single telephone line, they must switch between facsimile and voice transmission modes. There are several devices that can switch between modes automatically, such as: U.S. Pat. No. 4,815,121, entitled COMMUNICATION APPARATUS RECOGNIZING SPEECH AND AUTOMATICALLY SWITCHING FROM DATA TO SPEECH TRANSMISSION, issued in the name of Yoshida on Mar. 21, 1989, and assigned to Canon Kabushiki Kasisha, and U.S. Pat. No. 4,908,851, entitled FACSIMILE APPARATUS OPERABLE IN FACSIMILE OR CONVERSATION MODE issued in the name of Kotani et al. on Mar. 13, 1990, and assigned to Sharp Kabushiki Kaisha. Yoshida solves the problem of selectively switching between the data and speech transmission by use of a voice detector. Kotani et al. automatically switches over to voice when the standard facsimile hand shake signals are not received. However, these devices are not conducive to multiple switching back and forth concurrent with on-going voice communications, and they still can leave the less sophisticated users bewildered.

Simultaneous with the upsurgance of new telephone equipment was the development and popularization of the personal computer, and modems facilitating the transmission of digital data between computers over standard telephone lines. However, modems do not, in and of themselves, solve the problem of obtaining and displaying data for the average telephone user. These modems are often associated with extensive equipment including computers and display terminals, and they still require relatively sophisticated levels of understanding and abilities to use them. Also, as with facsimile machines, not all modem users are in a position to have a dedicated telephone line for data only. Switching between normal voice telephone line usage and data transmission usage can be done, for example, as taught by U.S. Pat. No. 4,723,268, entitled DUAL MODE PHONE LINE INTERFACE, issued in the name of Newell et al. on Feb. 2, 1988, and assigned to International Business Machines, which includes a method of providing the required FCC billing delay for auto answer modems that can be selectively switched between human answer telephone set modes and modem modes.

Modems with their ability to communicate digital data over telephone lines have opened up a whole new world of information exchange. An example of some of the possibilities were contained in U.S. Pat. No. 4,387,271, entitled COMBINED TELEPHONE AND DATA-TRANSFER SYSTEM, issued to Artom on Jun. 7, 1983, and assigned to CSELT Centro Studi e Laboratori Telecomunicazioni S.p.A. Artom describes subscriber controlled receipt of information by a telephone receiver, a personal computer, and a television by way of a local telephone line. Artom offers some wonderful possibilities for the future of home entertainment and information systems, however such total systems can be rather costly, complex, and still require a fair amount of expertise to operate.

A patent by Barsellotti incorporated a modem internal to a telephone unit for the purposes of receiving and displaying limited visual data, such as the telephone number called. This Barsellotti patent, U.S. Pat. No. 4,608,686, entitled TWO WIRE VOICE AND DATA SUBSCRIBER LOOP, issued to Barsellotti on Aug. 26, 1986, and assigned to the Mitel Corporation, was a step in the right direction. However, once again, it requires special, complex, and expensive equipment.

In a concept similar to Barsellotti, Vij et al. provided a telemarketing system in which a telemarketing switching network can distinguish between several incoming lines. With this device, as disclosed in U.S. Pat. No. 4,788,682, entitled TELEPHONE SYSTEM ADAPTED TO TELEMARKETING, issued to Vij et al. on Nov. 29, 1988, and assigned to Northern Telecom Limited, product information associated with a particular phone number can be transmitted to a telemarketing agent along with the call itself.

Several other inventions have also addressed some special aspects or problems in combining voice and data transmissions. For example, U.S. Pat. No. 4,827,085, entitled VOICE AND IMAGE TELECONFERENCING SYSTEM INCLUDING PAPERLESS FACSIMILE MEANS, issued to Yaniv et al. on May 2, 1989, and assigned to Ovonic Imaging Systems, Inc., describes a touch-sensitive display screen with a typical teleconferencing phone, which allows users to sketch a drawing by touching a screen and then transmit that sketch to another user with a similar device. Another patent that extended this idea of combined voice and data communications is U.S. Pat. No. 4,659,876, entitled AUDIOGRAPHICS COMMUNICATION SYSTEM, issued to Sullivan et al. on Apr. 21, 1987 and assigned to SPI Soft Pac International. This Sullivan et al. patent shows combined interactive graphics and audio communication with computer-like display screens on telephones. As with many previous devices, this Sullivan et al. invention requires rather expensive complicated equipment to replace existing conventional voice communication telephones, and it requires two users of relatively equal and high level sophistication, both with the same equipment.

Consequently, while there are many new innovations in telephone and computer equipment and technologies relating to concurrent voice and data transmission, they all require relatively sophisticated users and special, complex and expensive equipment. Such equipment often is designed to replace conventional voice telephone devices as opposed to merely adding to them, and those users who possess an anti-computer bias, cannot afford such high-tech equipment, or for whatever reasons are either unable or simply not interested or willing to acquire the necessary expertise or equipment, are essentially left out. As a result, there was, prior to this invention, still not any equipment available that enabled a person to receive and view visual data over the telephone line concurrent with voice conversation, while interacting with a person who wants to transmit such visual data, and using equipment which allows the receiving party to remain almost completely passive in the visual data transmission process and in the use of the equipment. Thus, prior to this invention, there was nothing available, for example, to allow a travel agent to display a travel itinerary or a broker to display the details of a financial transaction almost instantaneously and concurrently with voice communications over the telephone lines to an average telephone user.

SUMMARY OF THE INVENTION

Accordingly, a general object of the present invention is to provide a communication system which is capable of providing a more efficient, faster, less expensive, and less error-prone exchange of information.

Another object of the present invention is to provide a telephone system for both audio and visual transmission which requires less equipment and only equipment of a less complicated nature from the receiver's standpoint than heretofore available.

Further, it is an object of this present invention to provide a telephone system with greatly expanded data display capabilities and possibilities, such as access to enormous databases, despite having fewer and less complicated pieces of equipment.

It is yet another object of the present invention to provide a telephone system in which a receiving party can be provided with both audio and visual access to information and data bases, or merely to get visual confirmation of transactions without requiring that receiving party to be skilled in the use of computers or possess expensive and complicated equipment.

A more specific object of this invention is to provide a telemarketing or other consumer access system that combines all the advantages of interacting with a live agent or service provider with a visual display of information or data useful to a caller. A further object of this invention is to provide a visual data access system for consumers that is truly "user friendly" by combining speed and accessibility of computer technology and data transmission and display with concurrent human voice interaction wherein the sender controls and operates the visual data transmission and the receiver simply views it.

Still further, it is an object of the present invention to provide such a telemarketing system which can utilize and take advantage of the existing conventional telephone equipment of both the service provider and a consumer or caller.

Another specific object of the present invention is to provide an audio-visual telecommunication system which requires no new tariffs or changes to the existing public switching equipment and lines.

Additional objects, advantages, and novel features of the invention shall be set forth in part in the description that follows, and in part will become apparent to those skilled in the art upon examination of the following or may be learned by the practice of the invention. The objects and the advantages of the invention may be realized and attained by means of the instrumentalities and in combinations particularly pointed out in the appended claims.

To achieve the foregoing and other objects and in accordance with the purpose of the present invention, as embodied and broadly described herein, the system and apparatus of this invention may comprise a subscriber or receiver station in which a display terminal is added to a conventional telephone or other voice communication equipment. Such display terminal, which may be in the form of a matrix liquid crystal display (LCD), cathode ray tube (CRT), or other display technology, is capable of receiving text, graphics, and picture data. The display terminal is also essentially "dumb" to the receiver in that it is almost entirely controlled from a remote location, such as an agent position, which allows the receiver to be almost completely passive and inactive in the visual data transmission. The subscriber position may additionally include a voice/data selector, either as an integral portion of the display terminal or as a separate device. The voice/data selector is capable of selectively connecting the typical incoming telephone line to the subscriber telephone or the subscriber display terminal. The remote location agent position is similarly equipped with a telephone or other voice communication device and a display terminal, which is usually in the form of a personal computer or other data terminal. The agent display terminal may further be tied into a larger main frame computer, which the agent may utilize for storage, generation, or transmission of data.

Also, the method of this invention can begin with establishment of a voice communication between subscriber and agent over the respective telephone devices. This transaction between agent and subscriber can be accomplished using existing, standard telephone lines. At a desired time during the course of the conversation, the agent can interrupt the telephone conversation momentarily and transmit display data to the subscriber display terminal, also over existing, standard telephone lines. It is preferred that this display data be encoded in some standard digital code such as any of the large number of graphics and text protocols, or any software compatible code such as ASCII. This transmission of display data requires no effort or input from the subscriber beyond mere possession of the display terminal. Following the transmission of display data, the voice communication linkage may be automatically re-established, while the displayed data is retained.

The display data may be in the form of existing pre-established patterns such as advertising, trademarks, option menus, price lists, news, or announcements. However, this display data may also be dynamically constructed by the agent during the telephone conversation. Such dynamic display data might include, for example, a travel itinerary, individualized grocery order lists with associated grocery item prices, purchase options, business or financial data, visual confirmation of verbal transactions or orders, or even medical information.

During the typical voice communication, the voice/data selector may be defaulted to the telephone. However, the voice/data selector constantly monitors the incoming signal on the telephone line. When a particular tone sequence or other signal is detected indicating the beginning of a transmission of display data, the voice/data selector can automatically switch the incoming data stream to the display terminal. Following the transmission of display data the voice/data selector can automatically switch back to the telephone for continued voice communication.

In the preferred embodiment, the agent is human, creating a friendly, personal interface between the subscriber and the database of information sought. However, the agent may also be a computer in which the transaction between agent and subscriber is provided according to a preestablished program or which is conducted through subscriber selection of menu options displayed on the subscriber display terminal, from the computer. In the latter case, the subscriber may enter his or her selection by means of pressing the appropriate keys on a touch tone phone, for example.

BRIEF DESCRIPTION OF THE DRAWINGS

The accompanying drawings, which are incorporated herein and form a part of the specification, illustrate preferred embodiments of the present invention, and together with the description, serve to explain the principles of the invention. In the drawings.

DETAILED DESCRIPTION OF THE PREFERRED EMBODIMENTS

Figure 1:
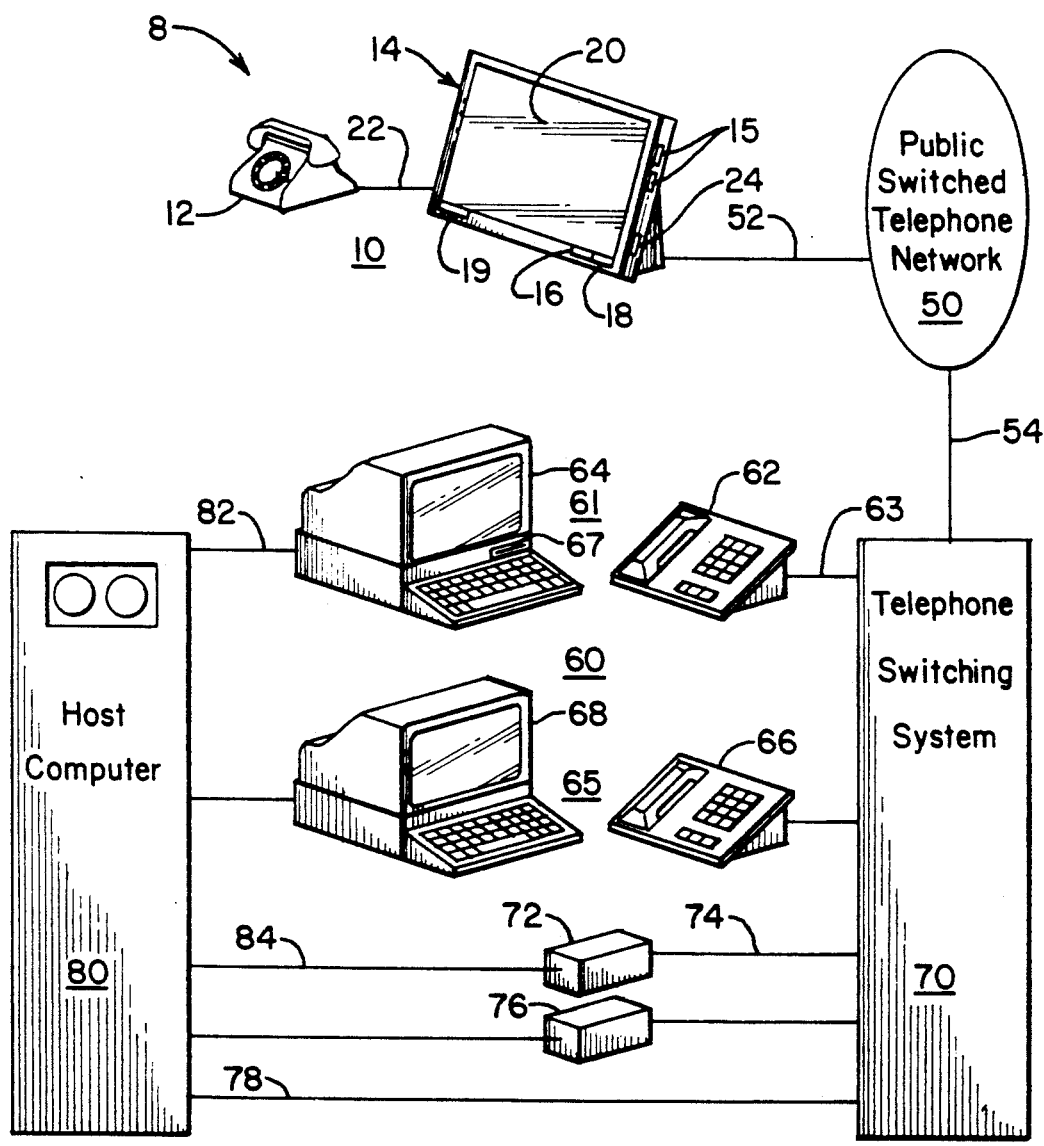
FIG. 1 is a representation of the first preferred embodiment of the telephone display system of the present invention showing both the subscriber position and agent position.

The telecommunication display system 8 of the present invention, as shown in FIG. 1, enhances traditional or plain old telephone voice communication with a display terminal 14 positioned at a subscriber or receiver location 10, which display terminal 14 is capable of receiving text, graphics, pictures, and other visual information during the course of voice communications. One application of the present invention is to the telemarketing or telephone sales industry, and it is this application which is depicted in FIG. 1 with telemarketing center 60. The use of this telemarketing application in this specification is for the purpose of facilitating the description of the principles and components of this invention and is not for the purpose of limitation, since other applications are possible, as will be discussed below.

A typical telemarketing center 60 might have one or more telemarketing agent positions, depicted generally in FIG. 1 as agent positions 61 and 65. Because of these multiple agent positions 61, 65, telemarketing center 60 may also contain telephone switching system 70 in the form of a PBX, central office switch, or other network switch.

When a telephone call from a remote location, such as a subscriber position 10, is received by center 60, switching system 70 directs the call to one of the agent positions, such as, for example position 61. Such a telephone call may typically be predominated by voice communication using plain old telephones 12 and 62, respectively. However, at desired times during the conversation, a telemarketing agent (not shown) at position 61 can momentarily interrupt the telephone conversation and transmit data or messages over standard telephone trunk 54 and line 52 to a display terminal 14 at the subscriber's location 10 for viewing by the subscriber (not shown) and possible standard telephone trunk 54 and line 52, along with the public telephone system 50 and the standard telephones 12 and 62, are typical of the state of the art analog telephone systems that are provided by public utility telephone companies to homes and businesses and are commonly referred to as "plain old telephone system" or "POTS".

The display operation according to this invention is self-contained and controlled totally by the telemarketing agent at position 61, requiring nothing more from the subscriber at location 10 than the possession of the display terminal 14 and passive viewing of the data displayed. Terminal 14 is fed by a standard telephone line 52, which is usually analog, from a Public Switched Telephone Network 50, in other words, a plain old telephone system of POTS, as described above.

Display terminal 14 is essentially "dumb" in that it does not require active input from the subscriber or receiver, but is controlled almost entirely and remotely by the telemarketing agent at position 61. The telemarketing agent has a conventional telephone device 62, which may support analog or some other telephone protocol, as determined by switching system 70. Telephone 62 is connected by telephone line 63 to switching system 70. The agent at location 61 can have a data terminal 64, connected by data interface 82 to a host computer 80. Host computer 80 might not be necessary in some applications, if data terminal 64 is, for example, a personal computer or similar equipment. Data interface 82 can be whatever is appropriate to match existing protocol between host computer 80 and data terminal 64, such as, for example RS-232 or 3270 protocol. Also associated with agent position 61, as shown in FIG. 1, but not necessarily in proximity of telephone 62 or data terminal 64, is a modem 72, which is connected between host computer 80 and the switching system 70 by data interface 84 and telephone line 74. In this embodiment, the host computer 80 has stored therein one or more data bases or other data, some of which the subscriber or receiver might wish to see. Such display data is down loaded to the subscriber from the host computer 80 along a different line, i.e. line 74, to switching system 70, and then to the telephone trunk 54 upon which voice communication travels. However, the agent at position 61 still controls the transmission of this display data from position 61, primarily by appropriate input to data terminal 64.

Similar to agent position 61, agent position 65 can include a conventional telephone device 66, which also may be analog or other protocol, a data terminal or personal computer 68, and a modem 76. As indicated above, there might, and will typically, be several other telemarketing agent positions in addition to positions 61 and 65, using the same host computer 80 and switching system 70. However, such other agent positions need not be shown for the purpose of describing this invention and, for simplicity, are not shown.

In operation, a telecommunication linkage is established and conducted primarily by a voice connection between subscriber telephone 12 and telemarketing agent telephone 62 in a conventional manner, such as by either the subscriber or the agent dialing the other's telephone number. For example, this communication can be initiated by the subscriber (not shown) at location 10 making a call to the telemarketing center 60. This call is routed at the subscriber's position 10 from telephone 12 along telephone line 22 through display 14 and then out along telephone line 52 to the public telephone switching network 50, in other words, via the POTS. More information concerning the workings of display 14 and the internal pathway for this calling signal will be described below.

This call is then routed by the POTS or Public Switched Telephone Network 50 to the telemarketing center 60 in a conventional manner, where it is received at switching system 70. Switching system 70 may be any common system available on the market, such as those currently available from AT&T, Northern Telecom, or Rockwell. Software internal to switching system 70 locates and directs the call to a free agent, such as, for example, agent position 61. As soon as this incoming call is received at switching system 70, a three-way conference call arrangement is established between: (1) the incoming call from subscriber at location 10 along line 52, network 50, and trunk 54; (2) agent telephone 62 along line 63; and (3) associated modem 72 along line 74. The three-way conference call arrangement ensures there will be sufficient connections available within switching system 70 when the agent desires to transmit display data. The assurance of available connections provided by this three-way conference is especially important for large telemarketing centers containing numerous agents at numerous agent positions.

During the course of the voice communication, the telemarketing agent at agent position 61 can be formulating or deciding on the display to eventually be transmitted to subscriber location 10, with or without verbal input, requests, or suggestions by the subscriber. Such display data may already exist in whole or in part, or in random order in the data terminal or personal computer 64 or host computer 80. Alternatively, all or parts of these displays may be generated dynamically from data bases or may be entered directly from the keyboard, floppy disk 67 (shown on personal computer 64 in FIG. 1), hard disk, or other input means at data terminal or personal computer 64. At an appropriate time during the telemarketing communication, the agent at location 60 can activate a data transmission command from data terminal 64, which is detected by host computer 80. Computer 80 in turn notifies software internal to switching system 70, via control line 78, to send out an appropriate signal along trunk 54, through Public Switching Network 50, and along telephone line 52, eventually arriving at a signal-activated display terminal 14 at the subscriber location 10. This appropriate signal causes display 14 to switch from a voice communication linkage with telephone 12 to a data communication linkage with display screen 20, as will be explained more fully below.

Once the voice communication linkage has been temporally suspended and the data communication linkage has been fully established from data terminal 64 through host computer 80 to subscriber display 14, the transmission of the display data is initiated. Host computer 80 then sends out the digital encoding of the desired display by way of line 84 to modem 72.

Modem 72 may be a standard or special modem that is capable of modulation and demodulation of binary digital information into audio tone signals suitable for transmission over standard analog telephone lines. This modulated digital signal is transmitted to switching system 70 by line 74, where it is sent out to display terminal 14 immediately following the appropriate display activating signal sequence. The remainder of this data transmission connection is through trunk 54, public telephone switching network 50, and telephone line 52 to display terminal 14.

This display data transmission may be accomplished in standard ASCII code, especially if it only comprises written material, to keep data transmission time to a minimum, as opposed to the pixel-by-pixel transmission that is common with facsimile devices, video cameras, and other display data. This ASCII code is mentioned for the sake of example and not for limitation as the display transmission may be in any other standard digital software code or protocol as well. A typical display transmission will take in the range of about eight seconds when transmitted at a baud rate of 2400 bits per second, as will be discussed more fully below.

Following transmission of the display data, the voice communication is immediately re-established automatically between telephones 12 and 62. Display of data on screen 20 is retained by display terminal 14 in a fixed manner, even after re-establishment of voice communication, thereby facilitating verbal discussion of the data, as well as allowing the subscriber or receiver of the data sufficient time to assimilate and study it to his or her satisfaction. The apparatus and process for automatic re-establishment of voice communication according to this invention will be described in greater detail below.

As an example, if the telemarketing agent is an airline ticket sales person or travel agent, he or she can put together a proposed travel itinerary during the course of, and in response to, the voice communication portion of the telecommunication transaction. Such travel itinerary may be generated, for example, utilizing information contained locally at data terminal 64 itself, or it may be created from information contained in a larger data base within host computer 80, with active inputs and data selections by the agent on the keyboard or other input device of the data terminal 64, but without requiring any active computer inputs or interfacing by the subscriber. Then at the appropriate time, when the travel agent wants to show the subscriber (traveler/ticket purchaser) this purposed travel itinerary, he or she can input an appropriate code or signal to data terminal 64 and thereby initiate transmission of the itinerary data for viewing on the subscriber terminal 14.

Additional examples of the types of data that may be displayed during a telemarketing communication include description of goods or services and their prices for comparison purposes or visual confirmation of an order. As an alternative, the agent switching system 70 can even be set up to transmit a display upon initial receipt of a call, while the call is being queued for a free agent or while the subscriber is on hold awaiting a free agent. Examples of such initial displays may be the telemarketing center's logo or trademark, or other displays such as a recipe of the week for phone orders placed to grocery stores.

Terminal 14 should be fitted with a minimum of user controls, which in this case may be an on/off switch 24, a screen scroll button 16, a screen clear button 18, and picture controls 15. Picture controls 15 may include a contrast control and, in the case of a CRT screen, a brightness control. The other control 19 is optional print button, and will be discussed below. In keeping with the principles of this invention, which teach an essentially "dumb" or passive terminal, terminal 14 contains no keyboard, hard disk, floppy disk, or other means of data entry locally at subscriber location 10, although it could also be equipped with those kinds of active input, data processing, and data storage devices, if desired.

Figure 2:
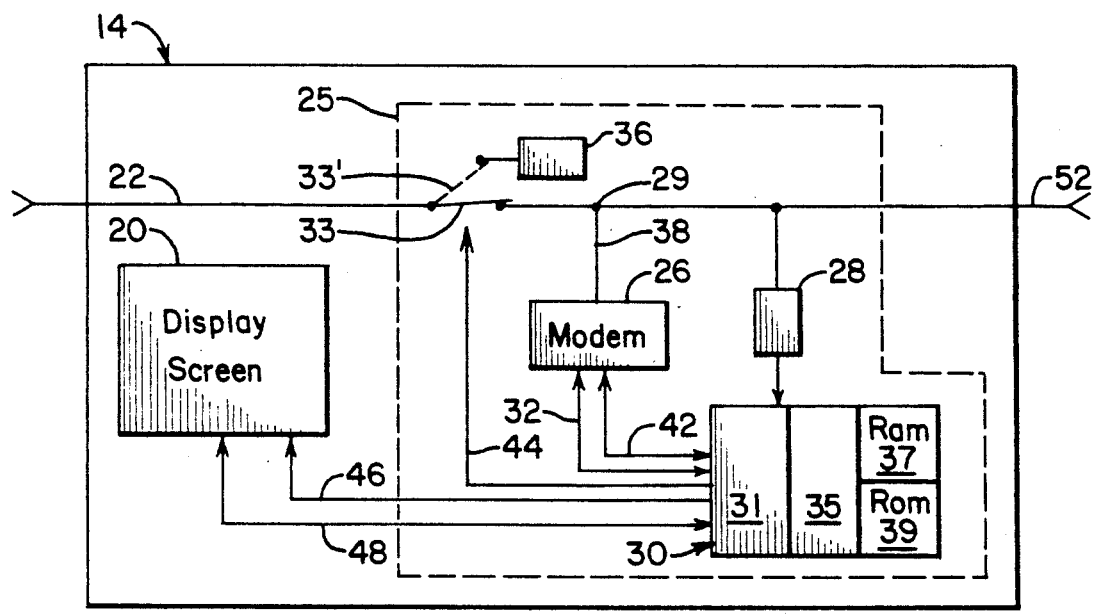
FIG. 2 is a schematic representation of the subscriber position display terminal.

Display terminal 14 contains internally a voice/data selector 25, as shown in FIG. 2. Voice/data selector 25 establishes a three-way communication linkage at junction or node 29 between incoming line 52, telephone line 22 attached to telephone 12, and data line 38. Data line 38 is further fed through modem 26 and data line 32 to microprocessor 30. This three-way linkage is similar to the three-way conference call linkage established at the agent switching system 70.

Voice/data selector 25 includes a switch 33, which is set to a normally closed position, as shown in FIG. 2, to allow voice communication, whereby the incoming line 52 is connected to telephone position 12 (FIG. 1) by way of line 22. A line monitor 28 scans the incoming signals on line 52. When the monitor 28 detects the particular signaling sequence indicating the beginning of a data transmission, as was discussed above, it alerts microprocessor 30 in such a manner that microprocessor 30 in turn actuates switch 33 via path 44 to the open position, thereby momentarily disconnecting voice communication from or to subscriber telephone set 12 (FIG. 1). Microprocessor 30 also activates modem 26 or causes it to go offhook via control line 42, as well as alters display screen 20 via control path 46 to the reception of display data via line 32. This activation establishes a data communication linkage such that modulated digital data enters along incoming line 52 and is transmitted by line 38 to newly activated modem 26 for demodulation. The digital data is then transferred from modem 26 via line 32 and through microprocessor 30 to display screen 20 where it is displayed.

Microprocessor 30 and/or modem 26 handles all the necessary electronic handshaking and protocol typical of data transmissions. On subsequent transmissions of displays during the course of a single voice communication event, less handshaking or possibly even no handshaking may be required.

Microprocessor 30 may include a peripheral interface 31, which interfaces with most of the remaining components of display terminal 14, and a microcontroller 35, which acts as the central processing unit of display terminal 14. Microprocessor 30 may additionally include permanent memory storage capability ROM 39, which may contain operating instructions or even fixed displays internal to terminal 14. Additionally, temporary memory storage capability RAM 37 may be included in the general block microprocessor 30.

As described briefly above, actuation of switch 33 to its alternate state 33' also disconnects the telephone receiver 12 from the incoming line 52 during transmission of digital data. When this momentary disconnect occurs, telephone line 22 is alternately connected to tone source 36 during data transmission. Tone source 36, which is in an always on, ready state, as will be further described below, generates a pleasing tone that is heard over the telephone device 12 in place of the incoming modulated digital data. The pleasing tone of tone source 36 informs the subscriber or receiver on telephone 12 that he or she has not been totally disconnected from the agent position 61. A simulated voice message could also be used in place of, or in addition to, tone source 36 to inform the subscriber what is happening, and requesting that he or she stay on the line until the data transmission is complete. A default written message to the same effect could also be displayed on the screen momentarily while the data transmission is occurring. Such a default message may be stored internal to display terminal 14 itself, in either RAM 37 or ROM 39, and actively delivered to display screen 20 along data path 48 by microprocessor 35.

The end of a data string, therefore, the end of a data transmission, is detected by modem 26 or microprocessor 30. The end of a data transmission may be identified by microprocessor 30 by an end of file (EOF) marker or by modem 26 due to the end of the signal carrier. Once the end of data is detected, microprocessor 30 then generates a signal to re-activate switch 33 to its normally closed mode to re-establish the voice communication linkage to telephone set 12 while disconnecting the tone generator 36. Modem 26 then shuts down or goes onhook after the appropriate delay, thereby disconnecting the data communication linkage to display screen 20.

As already mentioned, display terminal 14 may be provided with the memory and software capabilities, such as RAM 37 or ROM 39, for storing several screens of display data. Variable memory space, such as provided by RAM 37, could be used to dynamically store several display screens, either during the course of a single telephone conversation or for later reference after the completion of a given telephone conversation. In the case of fixed special message display screens, which for example may read "Please Stand By For Receipt of Display Information," the display information is stored in permanent memory, ROM 39. Such additional stored screens could then be transmitted back and forth between display screen 20 and microprocessor 30 by data path 48.

In the absence of power, such as during a black-out, switch remains in its normally closed position allowing telephone device 12 to operate in normal voice transmission mode despite the inhibited display functions. Similarly, if power is lost during a data transmission, switch 33 returns to its normally closed position to allow continued normal operation of telephone 12.

Figure 3:
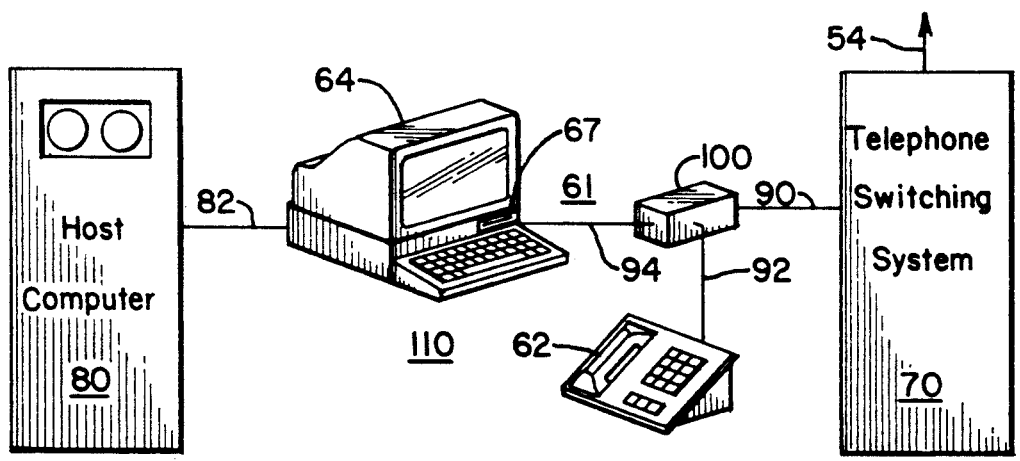
FIG. 3 is a representation of the agent position arrangement of an alternative embodiment of the present invention.

An alternative embodiment of agent center 110 is shown in FIG. 3. Only one agent position 61 is shown in center 110 for simplicity. However, this embodiment is equally adaptable to multiple agent positions. Center 110 contains the same agent switching system 70 and host computer 80 as the previous center 60. Similarly, agent position 61 also contains the same data terminal 64, connected to host computer 80 by data interface 82, and the same conventional telephone 62. The preferred feature of agent center 110 is a display interface 100. The three-way conference call connection among the switching system 70, the telephone 62, and the data terminal 64 is set up in display interface 100 instead of in switching system 70. Therefore, only one telephone line 90 need be directed to each agent position from switching system 70. This arrangement allows easy installation of the telecommunication display system of this invention without modification of existing switching equipment 70 and software. This three-way connection is between incoming line 90, telephone line 92 also connected to telephone 62, and data interface 94 connected to data terminal 64, and it occurs at node 129, as seen in FIG. 4.

Figure 4:
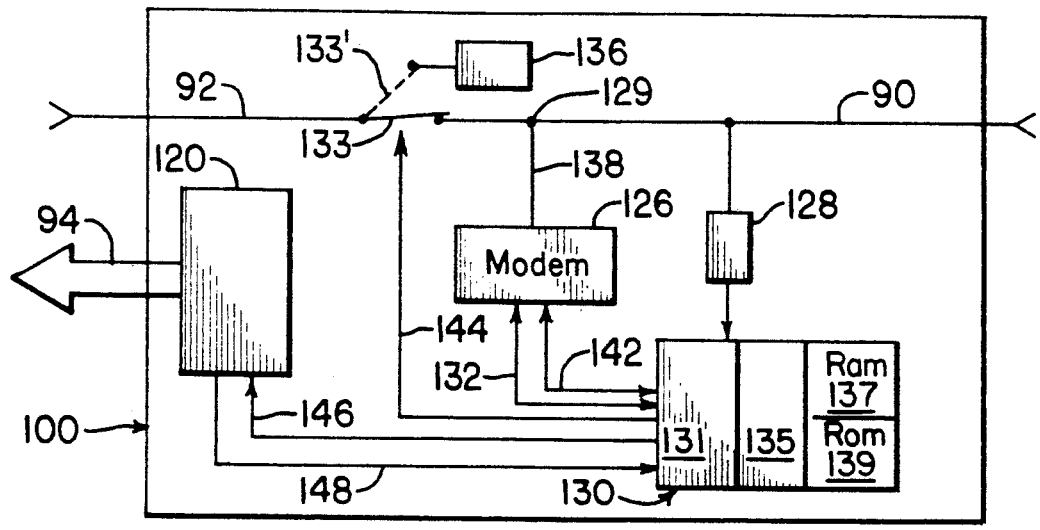
FIG. 4 is a schematic representation of the display interface.

Display interface 100, shown in FIG. 4, is very similar to the organization and structure of display terminal 14, except that it has a port 120 instead of a display screen 20. Port 120 may be an RS-232 serial port or other appropriate control interface. Display interface 100 does have a microprocessor 130, an internal modulator/demodulator or modem 126, tone or signal generator 136, and a line monitor 128. Line monitor 128 may be a standard touch tone receiver chip such as, for example, a Teltone M-957-01, if the intended data transmission identification signal is a touch tone signal. Line Monitor 128 allows display interface 100 to function in a similar fashion to line monitor 28 in voice/data selector 25 by alerting microprocessor 130 in the event of the possible reception of display data from a peer with a similar capability of transmitting display data. Microprocessor 130 may contain a peripheral interface 131 and microcontroller 135, and it can also contain temporary memory storage space in RAM 137 and permanent memory storage space in ROM 139, in the same fashion as those discussed above with reference to microprocessor 30. In this way, display interface 100 allows operation both for an agent and a subscriber equipped with a personal computer, such as terminal 64 in peer communication. Display interface 100 may even be in the form of a card installed internal to personal computer 64, in which case telephone lines 90 and 92 would be reconnected directly by jacks (not shown) to the back of personal computer 64.

In operation of the equipment at the agent center or position 110, when an agent at location 61 desires to transmit some graphics or other display data, he or she enters the appropriate command on the data terminal 64. Data terminal 64 in turn notifies microprocessor 130 in display interface 100 via interface 94, port 120, and control line 148 to begin to set up a data transmission. Microprocessor 130 activates modem 126 by taking it offhook via line 142, and flips switch 133 by way of line 144 to its alternate position 133'. A standard digital sequence indicating the beginning of a data transmission may be generated by internal modem 126. However, if for security reasons it becomes necessary to have a specialized digital sequence or inband signal, such a special sequence or signal can be generated by modem 126 or other circuitry within display interface 100. Such a signaling sequence would inhibit unauthorized access to a subscriber position display terminal 14. As before, no changes would be required to the serving switch 70 or to the public telephone switching network 50 with such a signal.

Once the initial data alerting string actuates modem 126, the digital data can be down loaded from the data terminal or personal computer 64 through port 120 and data 132 to internal modem 126 for modulation. Once modulated, this display data can be sent down line 138 and out line 90 to the subscriber location 10, where it is received, processed, and displayed as described above.

Actuating switch 133 to its alternate position 133' breaks the voice communication linkage between telephone lines 90 and 92 temporarily by connecting telephone 62 to tone generator 136 by way of line 92. This configuration prevents the transmission of the digital data from being heard on telephone receiver 62. Signal generator 136 can send out a pleasing tone or other audible message indicating data transmission is under way.

After the transmission of digital data, personal computer 64 sends an end of data transmission signal by way of interface 94 through port 120 and control path 148 to microprocessor 130. Microprocessor 130 then re-activates switch 133 to re-establish the voice communication connection between lines 90 and 92. A message is also sent from microprocessor 130 by way of path 146 through port 120 and interface 94 informing data terminal or personal computer 64 of the completed transmission. Subsequent to data transmission, modem 126 goes onhook after an appropriate delay, which for the sake of example and not intended as a limitation, could be one second.

As with the previous subscriber position modem 26, modem 126 at the agent's end can be any standard off the shelf modem or comparable device. For the sake of illustration and not intended as a limitation, modem 126 may be, for example, any stock 2400 Baud Hayes ™ modem. As described above, modem 126 can be set to go onhook after an appropriate delay of one second. This onhook delay time can usually be adjusted with typical off the shelf modems, such that this feature is disabled and the modem never goes onhook, or up to about 25 seconds. As described above, a one second delay seems appropriate with the present invention. One second is long enough to ensure the end of data, while not creating an unnecessarily long delay.

Display interface 100, similar to display terminal 14, also allows the maintenance of voice communication if power is lost by switch 133 remaining in the normal closed position between telephone lines 92 and 90. This operation occurs in a similar fashion to the procedure described above with reference to terminal 14.

Figure 5:
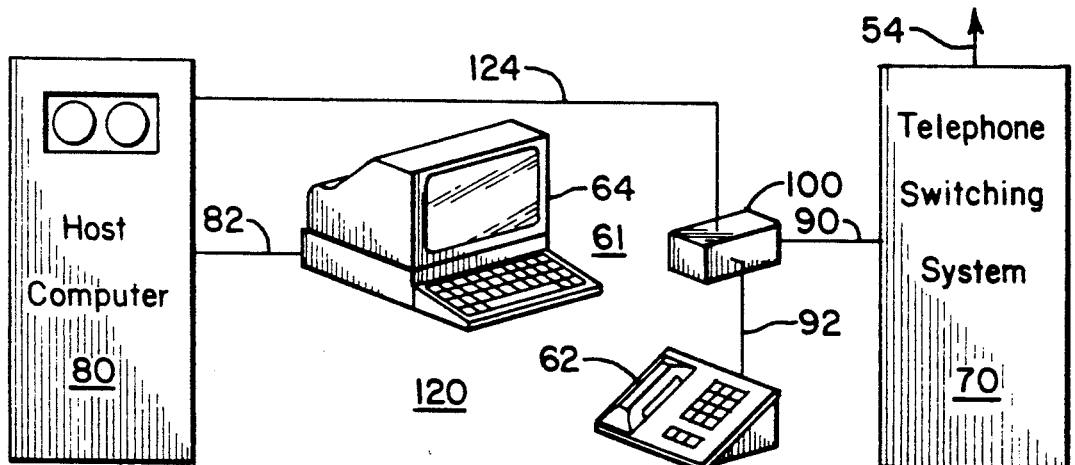
FIG. 5 is another representation of the agent position arrangement according to another alternative embodiment of the present invention.

Another alternative embodiment agent center 120, which can also include one or more agent positions 61, is shown in FIG. 5. Center 120, with its represented agent position 61, can be substantially the same as center 110 of FIG. 3, except that port 120 is connected directly to host computer 80 by interface 124 rather than to personal computer 64. As before the displays to be transmitted may either be called up from existing and stored displays or generated dynamically via data terminal 64. In either case, in this embodiment 120, the display is sent directly from or routed through host computer 80.

Figure 6:
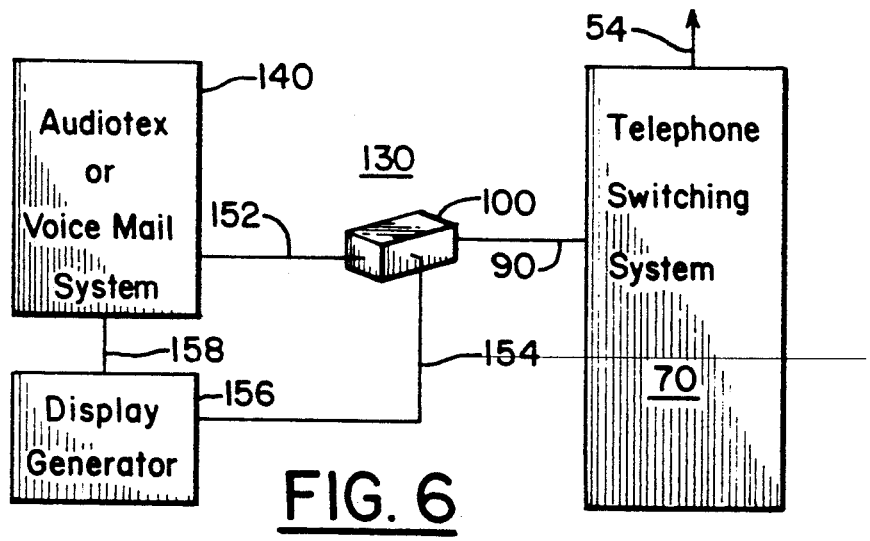
FIG. 6 is still another representation of the agent position arrangement according to still another alternative embodiment of the present invention.

In a further alternative embodiment 130, one or more telemarketing agents can be replaced by a recorded voice information system 140, as shown in FIG. 6. Voice information system 140 may be an audiotex system, such as, for example, Conversant TM manufactured by AT&T TM. Further, voice information system 140 may be a voice mail service, such as one of the several model available from Octel TM. Recorded voice system 140 may further be an integral part of the switching system 70, or it can be external to switching system 70, such as the system 140 shown in FIG. 6. Recorded voice system 140 may also be connected to host computer 80 (not shown in FIG. 6).

Embodiment 130 uses the same display interface 100 as described in the previous embodiments with telephone line 152 connected to recorded voice system 140. In embodiment 130 data transmission path 154 connects a display generator 156 to port 120 of display interface 100. Display generator 156 may be a separate processing system or combined with system 140. Display generator 156 is in communication with audiotex/recorded voice system 140 by linkage 158.

During operation of embodiment 130, the primary mode will again be voice communication. Typically, a subscriber or user will call into the audiotex or voice mail system 140, thereby establishing this voice communication. Once established, voice system 140 initiates preprogramed messages, or audio instructions, which may be in the form of a menu of options, such as, for example "press one to listen to your messages, press two to record a new greeting, etc." At the appropriate point, the voice information system 140 will notify the display generator 156 to begin the conversion to data communication, as described above.

A standard voice mail service 140 can record voice mail messages. These recorded voice mail messages may additionally be displayed by phone or extension number, date, and time called on the display terminal 14. When the subscriber dials into service 140 to retrieve his or her messages, voice mail service 140 may transmit a display listing the message. The subscriber can then select in a menu access fashion those voice mail messages he or she wishes to hear and in which order he or she wishes to listen to them. Accordingly, random access could be afforded to a voice mail system instead of the traditional, painstaking serial access method.

Figure 7:
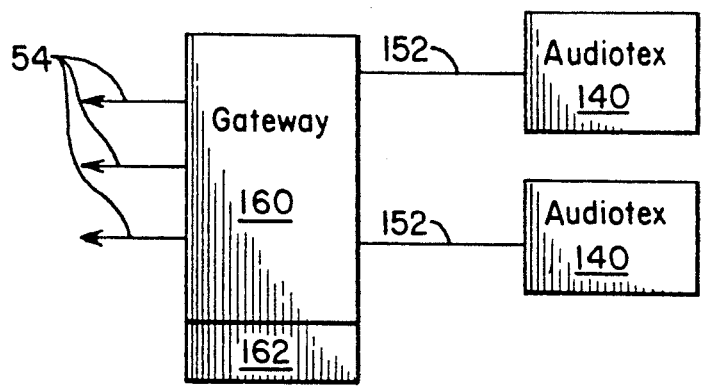
FIG. 7 is yet another representation of the agent position arrangement according to yet another alternative embodiment of the present invention.

Several such audiotex or voice mail systems 140 may be connected through a common gateway 160, as shown in FIG. 7. Such gateways are common in the industry. A caller, possibly with a display calls into gateway 160 via trunks 54. Based upon number dialed or other selection criteria such as a caller inputted digits, gateway 160 then directs the call to any one of several systems 140. Gateway 160 could generate its own displays or displays in association with systems 140 by use of an internal display generator 162. This allows both oral communication with a caller via systems 140 as well as transmission of display data via display generator 162, without requiring systems 140 to have their own display generator associated with them.

Referring again to FIG. 1, display screen 20 portion of display terminal 14, as shown and described above, is a flat screen, liquid crystal display (LCD). However, display terminal could also be a LCD or an electrochromic, eletroluminescent, plasma discharge, or vacuum fluorescent display, as well as a more conventional cathode ray tube (CRT) or any other visual display device include a portable pocket-sized screen, as would be obvious to persons skilled in this art after becoming familiar with the functions and components of this invention.

Now refering back to FIG. 2 to offer a few more details, the nature of line monitor 28 may vary depending upon the nature of the signaling sequence used to indicate the beginning of data transmission. Such a signaling sequence may be DTMF or MF tones. If the signaling sequence is a DTMF signal, as might be sent by a DTMF sender chip, which may be internal to modem 126 (FIG. 4), then line monitor 28 could be a DTMF receiver chip, which for the sake of example and not for limitation could be a Teltone TM M-957-01.

Also for the sake of example and not intended as a limitation, micropressor 30, including peripheral interface 31 and microcontroller 35, may be any one of several micropressor integrated chips such as an Intel TM 8051 microprocessor. Further, the RAM 37 may be any standard integrated chip, but again for the sake of example, may be comprised of multiple Harris TM 65162 chips, which are 2000×8 bit static RAM chips.

The display terminal 14 features of the present invention may be further augmented by the addition of a printer (not shown), which could generate hard copies of the displays received by terminal 14. The printer could be queued by any optional print screen button 19, as shown in FIG. 1. The printer could be any standard computer printer such as an EPSON TM LQ-1000. More elaborate printers such as the Apple Laser Writer Plus TM or the Hewlett Packard Laser Jet Series III TM would be equally applicable, however, they may have more capabilities than would be required with the present invention.

A screen 20 with 80 columns by 25 rows should be enough to display a complete travel itinerary or a complete audiotex menu. At 2400 baud, a complete display of 2000 characters or about 300 words, can be transmitted in approximately eight seconds, which compares to only about 10-20 words, spoken intelligibly, in the same time interval.

The on/off switch 24 on display terminal 14 need only be activated once upon initial set-up and installation of display terminal 14. Terminal 14 may remain in a constant on, ready posture from that point on. This constant on, always ready posture includes power being constantly supplied to tone generator 36 and microprocessor 30, as well as the other components of display terminal 14, with reference to FIG. 2, such that they are in an always on and ready state. Accordingly, on/off switch 24 need not be in a predominate position, such as the front or side as depicted in FIG. 1. Rather on/off switch 24 may be located in the back, behind a panel, or in some other concealed place.

Display terminal 14 can retain a given display on screen 20 after voice communication is re-established during a given telecommunication event, and it can also retain the display after the termination of such event when both parties have disconnected. A given display may therefore be retained and displayed indefinitely, until clear button 18 is pressed or another display is received.

Figure 8:
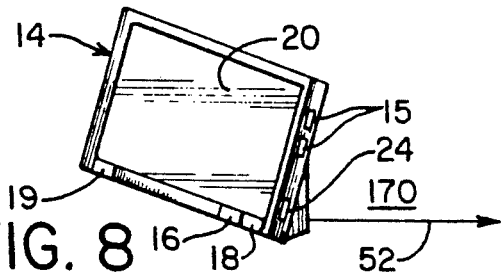
FIG. 8 is another representation of the subscriber position according to another alternative embodiment of the present invention.

Accordingly, the display terminal 14 may also serve as a visual answering machine or notification device. For example, terminal 14 can be set-up to act as a visual answering machine or in the alternative, terminal 14 may act as a notification device independent of a traditional telephone device 12, as seen in embodiment 170 in FIG. 8. Then when a call is received, terminal 14 will answer the call under appropriate conditions, either answering machine mode in embodiment 10 from FIG. 1, or as a notification device in embodiment 170 from FIG. 8, and is ready to display a given transmitted display. Such display would then be retained until the subscriber arrives back at location 10 for viewing. If the display terminal 14 has provisions for storing multiple screens of information, such as RAM 37 as described above, it can answer and record multiple screens of information for later viewing.

Figure 9:
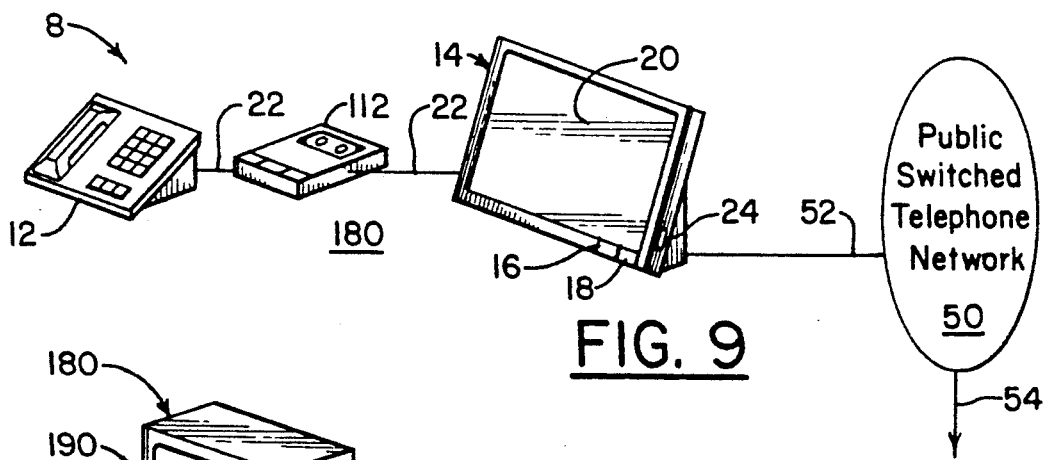
FIG. 9 is still another representation of the subscriber position according to still another embodiment of the present invention.

Additionally, a typical voice recording answering machine 112, found in embodiment 180 and shown in FIG. 9, can also be connected to telephone line 22. Answering machine 112 may be either internal or external to telephone device 12. In this embodiment 180, answering machine 112 could be set to auto-answer for the purpose of recording messages or screening calls as is well known in the industry. Upon receipt of a call, the three-way communication linkage could be established at node 29 in display terminal 14 (FIG. 2). If the caller desires to leave a voice message, switch 33 could remain in the normally closed position connecting incoming line 52 to answering machine 12 via telephone line 22, and a voice message could be left on the voice answering machine. However, if the caller wished to leave a display message in addition to, or instead of, a voice message, the appropriate signaling sequence could be transmitted down line 52. This signaling would still be detected by line monitor 28, as described above, activating microprocessor 30 and altering display screen 20 for the reception of the given display. During the transmission of the display, a pleasing tone generated by tone source 36 would be left as a message on answering machine 112. As described above, the caller can be re-connected to answering machine 112 following transmission of display data.

Figure 10:
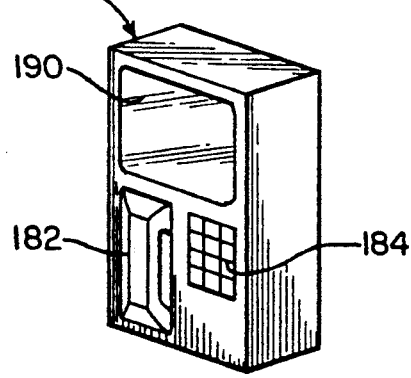
FIG. 10 is yet another representation of the subscriber position according to yet another alternative embodiment of the present invention.

It is also possible for a telephone device and a display screen, such as the above-described telephone 12 and display terminal 14, to be combined into a single unit 182, as shown in FIG. 10. The structure and operation of such a single unit 180, with its display screen 190, handset 182, and digital or analog dialing mechanism 184 is similar to that described above with reference to separate devices 12 and 14.

A single unit device 180 may be in the form of a private phone for personal or business use or in the form of a public telephone such as a courtesy or pay phone in hotel lobbies, airports, or restaurants for example. Such a public display phone 180 could be used by travelers to make airline reservations with a visual confirmation, by business people to exchange financial information, or by the general public to access the above-described audiotex or voice services 140, (shown in FIGS. 6 and 7).

Examples of consumer to business applications in addition to those given above include banking transactions, emergency hotline services, and entertainment. Examples of business to business applications include employee informational services, ordering of parts, daily news letters, and general information dissemination from headquarters to branch offices. Additionally, for business applications the above-described subscriber/agent relationship, could be replaced by an employee/employer relationship where each employee could play the role of agent in a peer-to-peer arrangement. A few possible examples of uses for specialized audiences include university course registration, hotel billing, notification services, and medical emergencies. Consequently, the applications for this invention are not limited to commercial telemarketing operations, but can be any situation where an active holder or creator of data or information needs to transmit the data for visual display to a passive viewer or receiver over the same telephone line on which they are having bidirectional verbal communications. The present invention can further serve as a service for the hearing impaired or any user who must operate in a noisy environment.

Although the present invention cannot directly access CompuServe TM and other videotex services or such public access databases, such as Prodigy TM, Lexis TM, and Dialog TM, it can access a knowledgable agent as described above who may have direct access to such services. Such public consumer databases require special equipment, knowledge, and frequently special training, which inhibits such use by persons who are not inclined to encounter those public consumer databases on those terms. The present invention may allow a consumer or subscriber access to these or similar databases with the benefit of a knowledgeable, helpful human agent at a telemarketing or other remote location to perform the complex user steps for the consumer to access such data.

Additional features are possible if the telephone switching system 70 can identify whether or not a caller is set up with a display terminal 14. Upon receipt of an incoming call, switching system 70 could respond with a pre-recorded greeting, followed by a prompt to the caller, such as, for example "press one if you have a display terminal." Such a determination of whether a caller has a display terminal 14 by switching system 70 may also be accomplished by way of an automatic query of line being transmitted. In which case, if the caller had a display terminal 14, microprocessor could receive and recognize the automatic query and respond with an appropriate signal indicating the presence of a display terminal 14. All of which could be accomplished without any effort or input on the part of the caller.

If the subscriber can receive displays, the above described three-way conference calling arrangement can be established and an initial display, including a trademark, advertising, or other useful information can be sent, while the call is queued to an agent station 61. Further, the agent at position 61 can be informed, possibly by an appropriate message from switching system 70 or from host computer 80 for display on terminal 64, as to whether or not a caller has a display terminal 14, such as subscriber location 10.

The party identification features could also be accomplished if some of the various above described elements support ISDN. The current public telephone network is analog. ISDN, which stands for "integrated services digital network", if adopted would establish a new digital network. ISDN, as currently proposed, would include two carrier bands or channels and one channel for signaling information or data, refered to as 2B+D. It is this D or data channel which carries signaling information, addressing, party identification, and other hand shaking or functional protocols which could be used as a substitute for the above determination of whether a caller has a display terminal 14. Thus, if trunk 54 supports ISDN, it would be possible for a switching system 70 to establish whether or not a particular user or subscriber has a display terminal 14, without requiring the above described verbal or keyed touch tone sequence such as, "Press one if you have a display terminal."

Further, if the trunk 54, the public switching network 50, and the subscriber's telephone line 52, all support ISDN, then the data communication link can be established on a separate channel, and the voice communication link need not be interrupted during display transmission. It should be understood that the present invention neither requires nor depends on the adoption of ISDN. One of the many advantages of the present invention, as described above, is its efficient operation with the existing analog public telephone network, even though the present invention, as well as the entire telephone system and its peripherals, might be enhanced by ISDN.

The features of the present invention may additionally be enhanced by a personal computer at or near subscriber location 10. The subscriber could then exercise some control over display terminal 14 himself or herself. He or she could send display data to other subscribers. This arrangement would allow the possibility of peer to peer transmission, or employee to employer as described above, although it departs somewhat from the passive terminal for unsophisticated users, which is an advantage of the first preferred embodiment described above.

Accordingly, a product and process are provided by this invention in which existing voice telephone communications are augmented in a manner that allows visual data reception and display by a passive subscriber or user concurrent with, and almost simultaneous with, voice communication over a telephone line. The data transmission, as described above, is not technically simultaneous with voice communications, since there is a short voice disconnect and delay during data transmission, but the disconnect and automatic reconnect are so easily activated and used by the agent and almost completely passive to the subscriber or receiver, that it can almost be considered for practical purposes to be concurrent and simultaneous.

One multiplexing arrangement compatible with public switched telephone network 50 is described above, however, any compatible multiplexing arrangement is possible. Accordingly, the foregoing is considered to be illustrative only of the principles and of an exemplary embodiment of the invention. Further, since numerous modifications and changes will readily occur to those skilled in the art, it is not desired to limit the invention to the exact construction and operation shown and described, and, accordingly all suitable modifications and equivalents may be resorted to falling within the scope of the invention as defined by the claims which follow.

The embodiment of the invention in which an exclusive property or privilege is claimed are defined as follows:

1. A telecommunications system for providing bidirectional voice communication and monodirectional visual communication via a plain old telephone (POTS) line hook-up between a live agent at an agent's position and a live subscriber at a subscriber's position where the subscriber's position is remote from the agent's position, said telephone communication system comprising:

subscriber equipment at said subscriber's position including a first telephone capable of transmitting and receiving bidirectional voice communications signals connectable to said POTS line, visual data handling means positioned adjacent said first telephone and also being connectable to said POTS line for receiving and converting data signals on said POTS line to visual images, and subscriber switching means actuateable by said live agent from said agent's position for alternately connecting said first telephone and said visual data handling means to said POTS line, said subscriber switching means having a voice mode in which said first telephone is connected to said POTS line and a visual mode wherein said visual data handling means is connected to said POTS line, said subscriber switching means being responsive to a control signal on said POTS line to switch from said voice mode to said visual mode and having defaulting means for returning and holding said subscriber switching means in said voice mode in the absence of the control signal on the POTS line; and agent equipment at said agent's position remote from said subscriber's position and having a second telephone capable of transmitting agent's voice communications signals spoken by said live agent and receiving subscriber's voice communications signals from said first telephone for reception by said live agent, said second telephone being connectable to said POTS line; control signal and visual data transmitting means actuateable and deactuateable by said live agent, but not by said subscriber or subscriber's position, positioned adjacent said second telephone and also being connectable to said POTS line for transmitting said control signal and visual data signals on said POTS line that are capable of being received and converted by said visual data handling means at said subscriber position, to visual images; and agent switching means actuateable by said visual data transmitting means for alternately connecting said second telephone and said control signal and data transmitting means to said POTS line such that the voice communication is bidirectional in the sense that both a live agent at the agent's position and a live subscriber at the subscriber's position can initiate, transmit, and receive voice communications to and from each other, and in which the visual communication is monodirectional in the sense that the agent or agent's position can select and initiate visual data communications for reception by the subscriber's position for display to the live subscriber, but the live subscriber or subscriber's position does not do anything to initiate or access data transmission from the agent's position.

2. The telecommunications system of claim 1, wherein said subscriber switching means comprises:

actuateable and deactuateable modem means connected to said POTS line for modulating data signals transmitted on said POTS line by said control signal and visual data transmitting means into digital data that are convertible by said visual data handling means to a visual image, said modem means being in an off hook condition when actuated and in an on hook condition when deactuated;

line monitor means connected to said POTS line in parallel to said modem means for detecting said control signal at the beginning of a visual data signal transmitted on said POTS line by said control signal and visual data transmitting means and for generating a start signal in response for detecting said control signal;

actuateable and deactuateable connector means for connecting and disconnecting said first telephone from said POTS line, said connector means being in a mode that connects said first telephone to said POTS line when deactuated and alternatively in a mode that disconnects said first telephone from said POTS line when actuated, said connector means having a deactuated default condition; and microprocessor means for receiving said start signal from said line monitor means, for actuating both said modem means and said connector means in response to said start signal, and for deactuating said modem means and said connector means when there is no visual signal on said POTS line.

3. The telecommunications system of claim 2, wherein said connector means is actuated by electric power and is deactuated when there is no electric power.

4. The telecommunications system of claim 3, wherein said subscriber equipment includes tone generator means connectable to said first telephone by said connector means for generating signals that are convertible by said first telephone to audio sounds, said tone generator means being connected to said first telephone when said connector means is actuated.

5. The telecommunications system of claim 3, wherein said microprocessor means include ROM means for storing permanent visual data that can be converted by said visual data handling means to specific visual images and wherein said microprocessor means is programmed to provide said permanent visual data to said visual data handling means when said modem means is deactuated.

6. The telecommunications system of claim 3, including RAM means connected to said microprocessor means for receiving and storing temporary digital data from said modem means that can be converted by said visual data handling means to visual images, said microprocessor means being programmed to divert said temporary digital data into said RAM means and to subsequently deliver said temporary digital data to said visual handling means.

7. The telecommunications system of claim 1, wherein said control signal and visual data transmitting means includes video data generating means for generating digital data that is capable of being converted by said video data handling means to video images, and transmitter modem means for converting digital data from said digital data generating means to data signals transmittable on said POTS line and receivable and convertible by said modem means in said subscriber switching means to the digital data.

8. The telecommunications system of claim 7, wherein said video data generating means includes a computer with keyboard input means for creating said digital signals.

9. The telecommunications system of claim 7, wherein said video data generating means includes a computer with memory means for storing and delivering said digital signals.

* * * * *

UNITED STATES PATENT AND TRADEMARK OFFICE
CERTIFICATE OF CORRECTION

PATENT NO. : 5,164,982
DATED : November 17, 1992
INVENTOR(S) : Richard A. Davis

It is certified that error appears in the above-identified patent and that said Letters Patent is hereby corrected as shown below:

In column 6, line 48 after "possible" insert --discussion. The--.

In column 6, line 63 change "of" to --or--.

In column 11, line 11 after "switch" insert --33--.

In column 19, line 11, change "response for" to --response to--.

Signed and Sealed this

Twelfth Day of April, 1994

Attest:

BRUCE LEHMAN

Attesting Officer

Commissioner of Patents and Trademarks